No. 622,359. Patented Apr. 4, 1899.
J. HOOD & S. H. REYNOLDS,
DENTAL ENGINE.
(Application filed Nov. 18, 1896.)
(No Model.) 3 Sheets—Sheet 1.
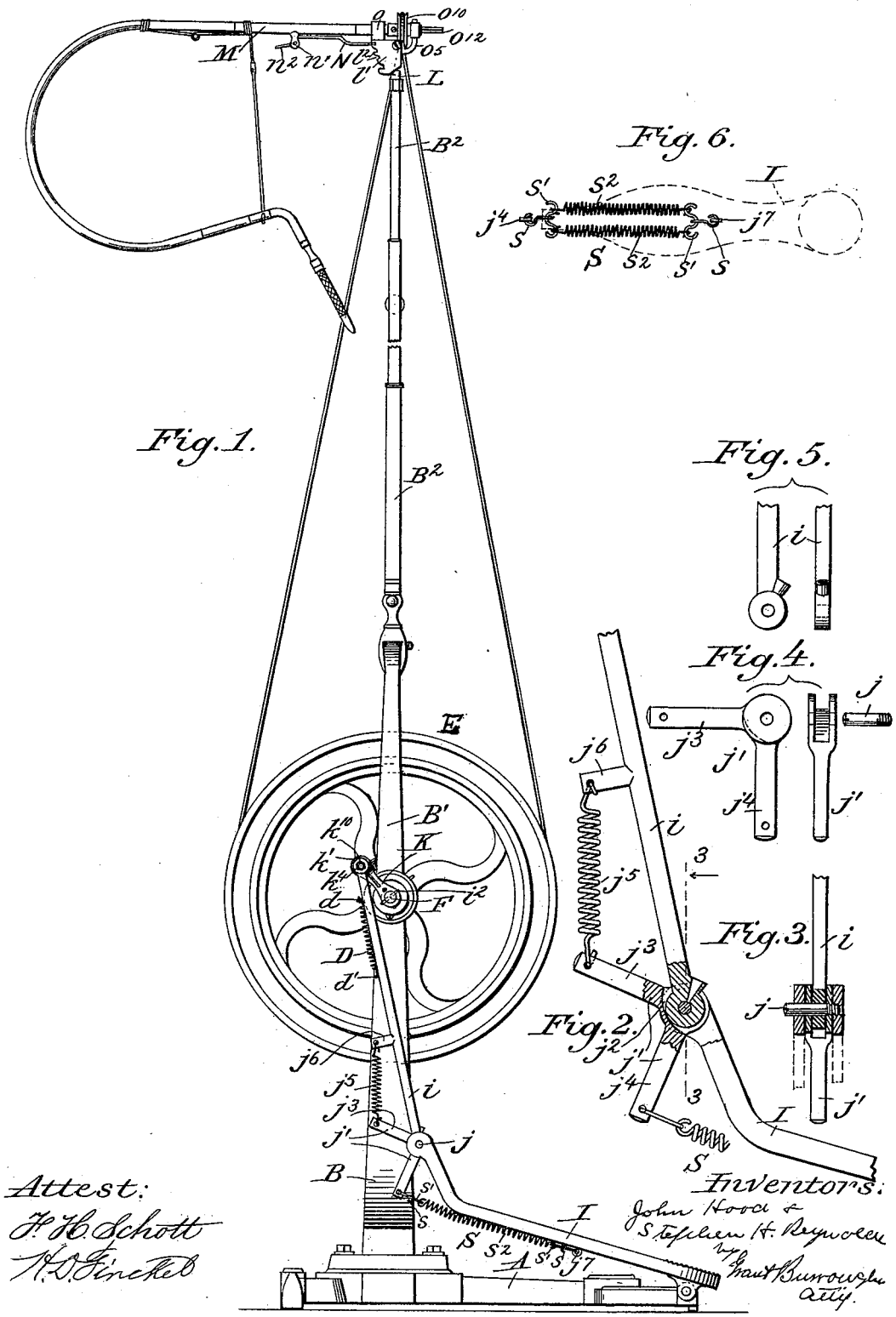

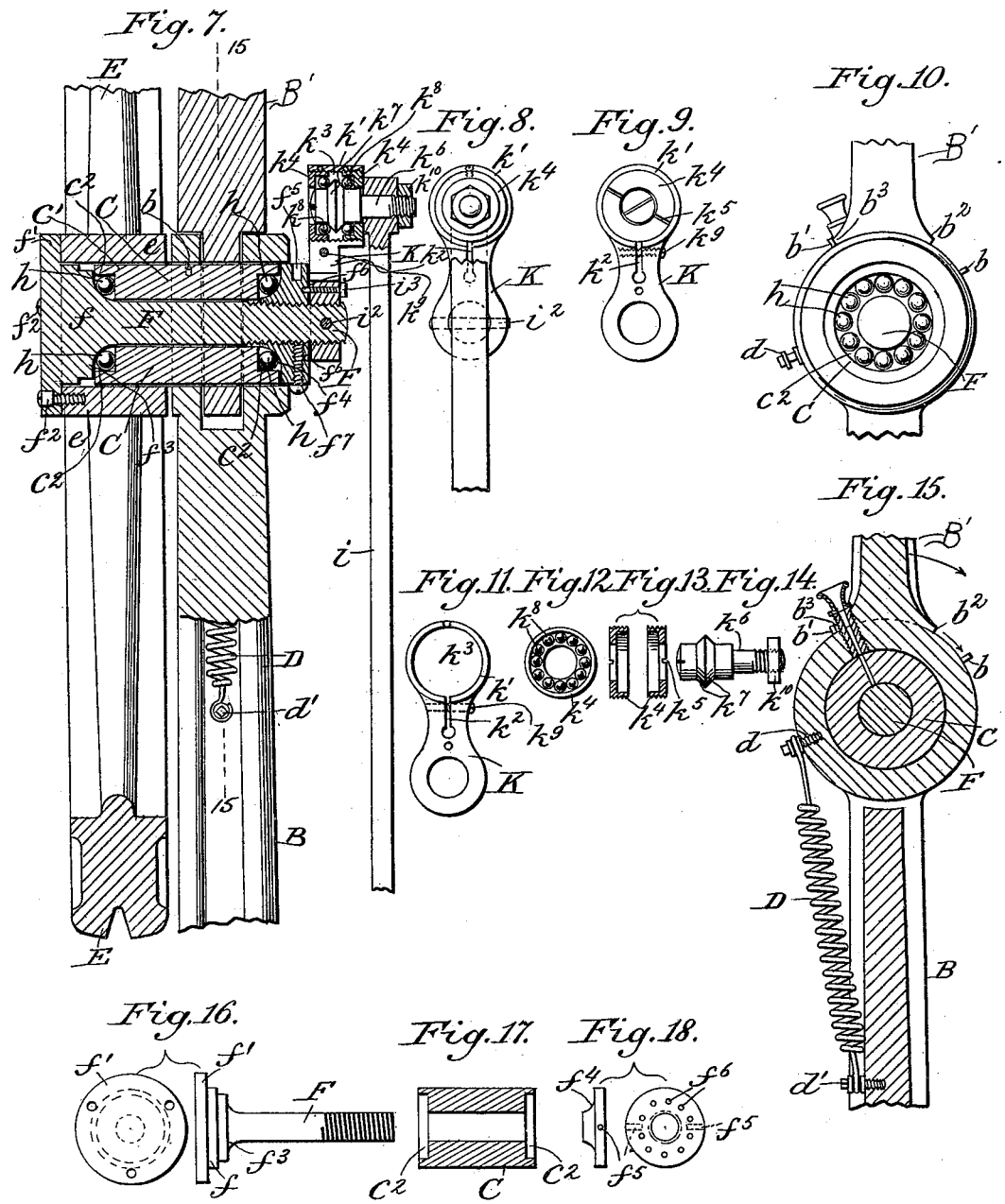

No. 622,359.
J. HOOD & S. H. REYNOLDS,
DENTAL ENGINE.
(Application filed Nov. 18, 1896.)
Patented Apr. 4, 1899.
3 Sheets—Sheet 3.
(No Model.)
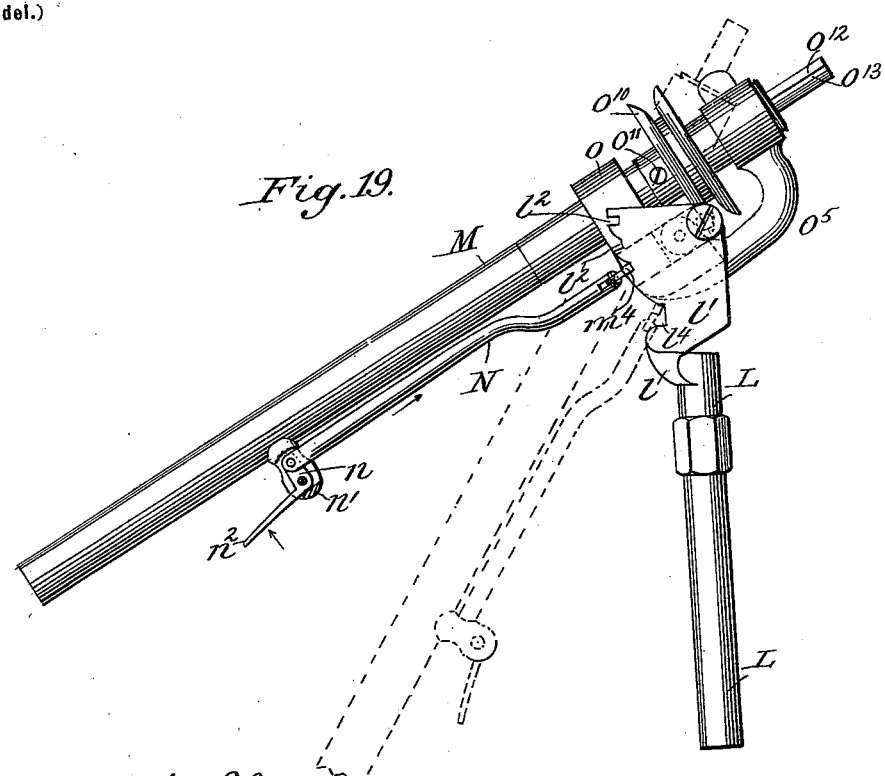
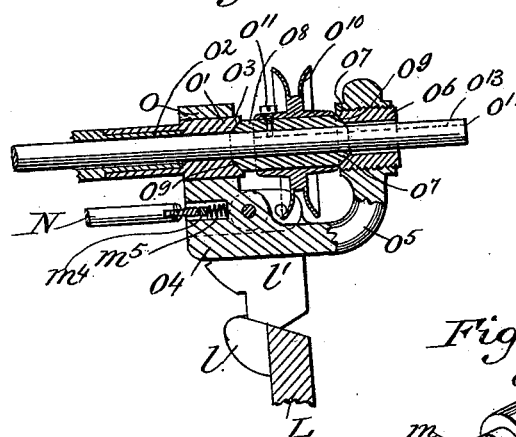
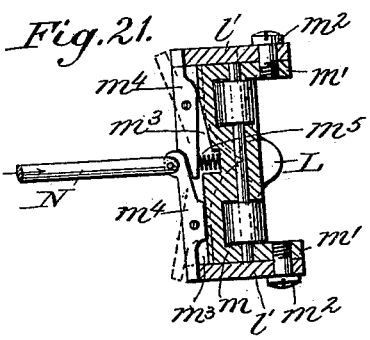
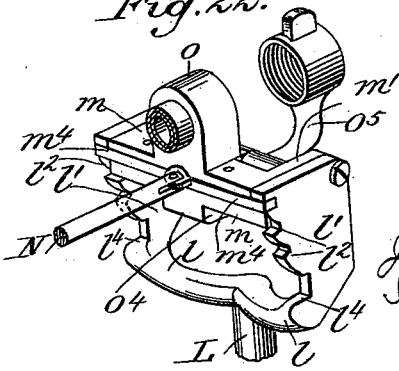
Attest:
F. H. Schott
H. D. Finskel
Inventors
John Hood &
Stephen H. Reynolds
by Grant Burroughs
atty

UNITED STATES PATENT OFFICE.

JOHN HOOD AND STEPHEN H. REYNOLDS, OF BOSTON, MASSACHUSETTS.

DENTAL ENGINE.

SPECIFICATION forming part of Letters Patent No. 622,359, dated April 4, 1899.

Application filed November 18, 1896. Serial No. 612,536. (No model.)

*To all whom it may concern:*

Be it known that we, JOHN HOOD and STEPHEN H. REYNOLDS, citizens of the United States, residing in Boston, in the county of Suffolk and State of Massachusetts, have invented certain new and useful Improvements in Dental Engines, of which the following is a full, clear, and exact description, such as will enable those skilled in the art to which said improvements appertain to make and use the same, reference being had to the accompanying drawings, which form a part of this specification.

The invention consists in the novel construction, combination, and arrangement of parts, such as will be hereinafter fully described, pointed out in the appended claims, and illustrated in the accompanying drawings.

In the accompanying drawings, in which similar letters of reference designate corresponding parts, Figure 1 is a side elevation of a dental engine embodying the several improvements. Fig. 2 is an enlarged detail view showing a side elevation, partly in section, of the connecting mechanism between the pitman and the treadle. Fig. 3 is a sectional view on the line 3 3 of Fig. 2. Fig. 4 is a detail view showing the angular lever mounted intermediate of the pitman and the treadle. Fig. 5 is a detail view showing the lower end of the pitman. Fig. 6 is a detail view showing a plan of the under side of the treadle and the spring mechanism attached thereto. Fig. 7 is an enlarged detail view, partly in section and partly in elevation, showing the driving-shaft and its adjuncts, and also the hinged connection between the lower and upper standards. Fig. 8 is a detail view showing an elevation of the connection between the pitman and the crank-arm mounted on the driving-shaft. Fig. 9 is a similar view taken from the opposite side of the crank-arm to that shown in the preceding figure. Fig. 10 is a detail view showing a side elevation of the hinge-joint from the crank side of the same, the crank and cone being removed to show the antifriction-balls. Fig. 11 is a detail view showing the crank-arm. Fig. 12 is a detail view showing one of the bearing-cups mounted in the crank-arm with antifriction-balls nested therein. Fig. 13 is a detail sectional view showing the bearing-cups. Fig. 14 is a detail view showing the cone-bearing shaft which connects the pitman with the crank-arm. Fig. 15 is a sectional view on the line 15 15 of Fig. 7. Fig. 16 is a detail view showing an end and a side elevation of the driving-shaft. Fig. 17 is a detail view showing a longitudinal section of the sleeve forming the pintle for the hinge-joint between the two standards. Fig. 18 is a similar view showing a side and end elevation of the adjustable cone of the driving-shaft. Fig. 19 is an enlarged detail view showing a side elevation, partly in section, of the mechanism connecting the support for the flexible shafting with the upper end of the rocking standard. Fig. 20 is a detail view showing a longitudinal section of the bearing-head. Fig. 21 is a plan view, partly in section, showing the locking mechanism for securing the tool-carrying arm in its adjustments relative to the rocking standard. Fig. 22 is a detail perspective view, partly in section, of the bearing-head.

In many of its features the engine in the present instance is substantially the same as the one shown and described in Letters Patent No. 548,989, granted October 29, 1895. Consequently features of the mechanism common to both constructions will not be herein described, except in so far as it is necessary to do so to give a proper understanding of the present invention.

Referring to the drawings by letter, A designates the base, which may be of any construction suitable in the premises. The lower or supporting standard B is secured thereto in any suitable manner and has hinged to its upper end the upper or rocking standard B'. The hinged joint between the two standards is formed by bifurcating the upper end of the supporting-standard and shaping the lower end of the rocking standard so that the latter will register with the bifurcation. The interlocking ends of the standards are provided with a transverse bearing, in which is mounted the sleeve C, which forms the pintle for the hinged connection.

The movement of the rocking standard relatively to the supporting-standard is limited by the pins or lugs $b$ and $b'$. (See Fig. 15.) These pins are mounted in the upper end of the supporting-standard in such positions as to engage with the projections $b^2$ and $b^3$, respectively, of the rocking standard when the latter is reciprocated, and they thereby limit the movement of the said rocking standard. One of the pins $b'$ is in such a position that when the projection $b^3$ is in contact with it the rocking standard will be in an upright position and in alinement with the supporting-standard. The other pin $b'$ is located so as to allow the rocking standard to be moved away from its normal position to a considerable degree.

The rocking standard is normally held in an upright position and in alinement with the supporting-standard by means of the spring D. The latter is attached at one end to the rocking standard by the screw $d$, turned into the enlarged lower portion of the said standard just below its pivotal point. At the other end the spring is secured to the supporting-standard by the screw $d'$, turned into the latter at a considerable distance below the hinged joint. This spring exerts its force on the rocking standard in such a manner as to cause the projection $b^3$ to engage with the pin $b'$, and thereby hold the rocking standard in an upright position and in alinement with the supporting-standard. When he desires, an operator can draw the rocking standard forward against the action of the spring to a position more favorable to his work. This forward movement is limited by the pin $b^2$, engaging with the projection $b$.

The sleeve C, forming the pintle for the hinge-joint between the two standards, is extended at one end $c'$. On this extension is mounted the fly-wheel E. In the sleeve is journaled the driving-shaft F. The latter has a head $f$ formed thereon which has a projecting flange $f'$, and it is secured to the fly-wheel by the screws $f^2$ $f^2$, passing through the said flange into the hub $e$ of the fly-wheel. In each end of the sleeve an annular recess $c^2$ is formed in the inner periphery of the same.

On the driving-gear, just inside of the head $f$, is formed a bearing-cone $f^3$. This cone, the driving-shaft, and the head may be made integral, as shown in the drawings, or they may be made separate and suitably assembled. On the opposite end of the driving-shaft is screwed a bearing-cone $f^4$. The latter is provided with holes $f^5$ $f^5$ in its periphery for the reception of a tool whereby it can be turned.

Interposed between the driving-shaft F and the sleeve C are the antifriction-balls $h$ $h$. The latter are held in place in their respective recesses $c^2$ $c^2$ by the cones $f^3$ and $f^4$. These cones also form bearing-surfaces. By means of the cone $f^4$, adjustably mounted on the driving-shaft, the proper adjustment of the balls can be secured and any wear of the bearing-surfaces can be taken up. A set-screw $f^7$ passes through the cone-bearing $f^4$ and impinges on the shaft F to secure the bearing in place after it has been adjusted. By the construction thus described it will be seen that the driving-shaft will be entirely supported by the antifriction-balls, and consequently will not come in contact with any other bearing-surface.

The shaft F is driven by the pedal I, pivoted to the base and connected with the said shaft by the intermediate mechanism, consisting of the pitman I' and the crank-arm K, mounted on one end of the driving-shaft. A taper-pin $i^2$ passes through the crank-arm K and the end of the shaft F and secures the arm in place. As an additional precaution to prevent the accidental turning of the cone-bearing $f^4$, a screw $i^3$ passes through the crank-arm K and engages with one of the holes $f^6 f^6$ (see Figs. 7 and 18) in the side of the bearing.

In the outer end of the crank-arm K a bearing $k'$ is formed and has a slot $k^2$ extending from the said opening toward the opposite end of the arm to a considerable distance. (See Figs. 7 to 14, inclusive.) In the opposite ends of the bearing-opening $k^3$ are mounted the annular bearing-cups $k^4$ $k^4$. These cups are screw-threaded on their outer peripheries and are adapted to be turned into the screw-threaded ends of the bearing-opening and are each provided with a slot $k^5$ to allow the employment of a turning-tool. The cups by means of their construction can be adjusted in their respective openings.

In the bearing-opening $k^3$ is mounted the shaft $k^6$, provided with a double cone-bearing $k^7$. On both sides of the double bearing, interposed between the same and the bearing-cups, are the balls $k^8$ $k^8$. The proper relative arrangement of the balls and the cone-bearing shaft can be secured by adjusting the bearing-cups. A set-screw $k^9$ passes transversely through that portion of the crank-arm provided with the slot $k^2$ and serves to take up the wear to a certain extent caused by the friction between the bearing-surfaces, and it also serves to hold the bearing-cups in place to some extent. The shaft is secured to the upper end of the pitman in any suitable manner. In the present instance it is secured by clamping the end of the pitman between the enlarged portion of the shaft and the nut $k^{10}$, turned on the end of the shaft.

A novel mechanism is provided for throwing the crank-arm off "dead-center." (See Figs. 1 to 6, inclusive.) The lower end of the pitman and the free end of the treadle are hinged together by a pintle $j$. On this pintle an angular lever $j'$ is also pivoted. The latter is pivoted at its angle and is recessed at $j^2$ to allow the lower end of the pitman to connect with the said pintle. The lever has two arms $j^3$ and $j^4$ extending substantially at right angles to one another. The upper arm $j^3$ is connected by the spring $j^5$ with the offset $j^6$, projecting from the pitman. The arm $j^4$ is connected with the lug $j^7$, projecting from the under side of the treadle, by means of the spring mechanism S. The latter consists of the hooks $s$ $s$, respectively, engaging with the outer end of the arm $j^4$ and the lug $j^7$. They have attached to them the cross-heads $s'$ $s'$. The ends of the latter are connected by the parallel springs $s^2$ $s^2$.

To the upper end of the rocking standard B' is attached in any suitable manner the telescopic extension $B^2$. In the upper end of the latter is swiveled the rod L. This rod is bifurcated and has formed integral with each of the arms $l$ $l$, formed by the bifurcation, a plate $l'$ in the shape of a quadrant. Between the plates $l'$ $l'$ is pivoted the rear end of the support for the flexible shafting M. The support consists of a plate $m$, having an arm $m'$ projecting from each end of the same. The plate is pivoted between the plates $l'$ $l'$ by the screws $m^2$ $m^2$, passing through said plates and the arms $m'$ $m'$. It is to be observed that the curved edge of the plates $l'$ $l'$ are concentric with the pivotal points where said plates and the arms $m'$ $m'$ are joined.

In the front edge of the plate $m$ a recess $m^3$ is formed, in which are pivoted the levers $m^4$ $m^4$. The outer ends of these levers project beyond the plate $m$ and are adapted to engage with the ratchet-teeth $l^3$ $l^3$, formed in the curved edges of the plates $l'$ $l'$. The inner ends of the levers overlap, and in the socket formed in the plate immediately back of said ends a coiled spring $m^5$ is seated and presses said ends outwardly. These levers form catches by means of which the support for the flexible shafting can be adjusted to either of several positions relative to a horizontal one. The downward movement of the support is limited by the projections $l^4$ $l^4$.

The catches are operated by the rod N, pivoted at one end to the inner end of the outer one of the levers $m^4$ $m^4$. It is pivoted at its other end to the angular lever $n$, pivoted to the under side of the support in the post $n'$. One end $n^2$ of the angular lever projects beyond the post and forms a finger-piece. By pressing upon this finger-piece through the intervening mechanism the catches or levers $m^4$ $m^4$ can be moved out of engagement with the teeth $l^4$ $l^4$.

Projecting from the upper face of the plate $m$ is a lug or arm $o$ and has mounted therein the end of the tube $o'$. The latter projects from the lug and has mounted on the projecting end of the same the tube $o^2$. The opposite end of the tube $o'$ has a cone-bearing $o^3$ formed therein. The plate $m$ has projecting from the under side of the same a lug $o^4$, from which the curved arm $o^5$ extends to the rear of the plate. The curved arm has a screw-threaded opening formed in its outer end, and the curvature of the arm is such as to bring said opening in alinement with the tube $o'$. A tube $o^6$ is screw-threaded on its outer periphery and is adjustably mounted in the screw-threaded opening in the end of the curved arm. The inner end of the tube $o^6$ is provided with a cone-bearing $o^7$.

Between the tubes $o'$ and $o^6$ is mounted the sleeve $o^8$, having cone-bearings $o^9$ $o^9$ formed on its ends, which are journaled in the cone-bearings $o^3$ and $o^7$, respectively, of the tubes $o'$ and $o^6$. This sleeve has mounted thereon the pulley-wheel $o^{10}$, provided with a set-screw $o^{11}$ for securing it in place.

In the bearing-sleeve is mounted the driving-shaft $o^{12}$, which communicates motion to the rotatable coil of the flexible shafting. The set-screw $o^{11}$, passing through the sleeve $o^8$, registers with the elongated slot $o^{13}$ in the shaft $o^{12}$, and thereby motion is conveyed from the pulley $o^{10}$ to the said flexible shafting. The elongated slot allows the rod $o^{12}$ to move in and out of the tube O' without interfering with its rotation.

The looseness which may be occasioned by the wear between the bearing-faces of the sleeve and the tubes $o'$ and $o^6$ can be readily compensated for by adjusting the tube $o^6$ in the curved arm. Furthermore, the sleeve $o^8$ can readily be removed by first withdrawing the rod $o^{12}$ in the usual manner and then unscrewing the tube $o^6$. The set-screw $o^{11}$ should be removed, so that the bearing-sleeve can be moved clear of the pulley through the opening in the curved arm after the tube $o^6$ has been unscrewed therefrom.

While the embodiment of the invention as hereinbefore described is the preferred form, yet such embodiment can be departed from to a considerable extent without departing from the spirit of the invention.

Having thus described our invention, what we claim, and desire to secure by Letters Patent, is—

1. In a dental engine, the combination of a standard, a tool-carrying support hinged to the said standard, detented plates secured to said standard, catches pivoted to said support and adapted to engage at their outer ends with the detents of said plates and having their inner ends overlapping, a spring pressing against the inner ends of said catches to normally hold the latter in engaging positions, a lever pivoted to the support, and a rod connecting said lever with said catches.

2. In a dental engine, the combination of a standard, a tool-carrying support hinged to said standard, detented plates secured to said standard, catches pivoted to said support and adapted to engage at their outer ends with the detents of said plates and having their inner ends overlapping, a spring pressing against said inner ends to normally hold the catches in an engaging position, and means for moving the inner ends of said catches against the action of said spring.

3. In a dental engine, the combination of a standard, a tool-carrying support hinged thereto, detented plates secured to said standard, spring-pressed catches pivoted to said support and adapted to respectively engage with said plates, an angular lever pivoted to said support, and a rod connecting said lever with said catches.

4. In a dental engine, the combination of a support, arms carried by said support and having bearings in their ends, a bearing-sleeve placed between said arms with its ends journaled in said bearings, a pulley mounted on said sleeve between said arms, and a driving-rod mounted in said sleeve to rotate with the same.

5. In a dental engine, the combination of a support, arms carried by said support and having bearings in their ends, a bearing-sleeve removably mounted between said arms with its ends journaled in said bearings, a pulley carried by said sleeve to rotate the latter, and a driving-rod mounted in said sleeve to rotate with the same.

6. In a dental engine, the combination of a support, tubes having cone-bearing mounted in said support, a sleeve having cone-bearings journaled in said tubes, and a driving-rod mounted in said sleeve so as to rotate with the same.

7. In a dental engine, the combination of a support, tubes relatively adjustable mounted therein, a bearing-sleeve journaled in said tubes, and a driving-rod mounted in said sleeve to rotate with the same.

8. In a dental engine, the combination of a treadle, a pitman hinged thereto, an angular lever pivoted on the pintle connecting said treadle and pitman, a spring connecting one arm of said lever with said pitman, and a second spring connecting the other arm of the lever with the treadle.

9. In a dental engine, the combination of a crank-arm having a sleeve formed therein, a pitman, a shaft mounted in said pitman and journaled in said sleeve and having a double cone-bearing, relatively-adjustable cone-bearing cups screwed into the ends of said sleeve on opposite sides of said cone-bearing on said shaft, means for securing said cups against accidental displacement, and anti-friction-balls interposed between said cups and said double cone-bearing.

In testimony whereof we hereunto affix our signatures in the presence of two witnesses.

JOHN HOOD.
STEPHEN H. REYNOLDS.

Witnesses:
ARTHUR SHAW,
GEO. L. RIDLEY.